United States Patent [19]

Rosenthal

[11] Patent Number: 5,209,237

[45] Date of Patent: May 11, 1993

[54] METHOD AND APPARATUS FOR DETECTING A SIGNAL FROM A NOISY ENVIRONMENT AND FETAL HEARTBEAT OBTAINING METHOD

[76] Inventor: Felix Rosenthal, 4020 Iva La., Annandale, Va. 22003

[21] Appl. No.: 705,493

[22] Filed: May 24, 1991

Related U.S. Application Data

[63] Continuation-in-part of Ser. No. 508,304, Apr. 12, 1990, abandoned.

[51] Int. Cl.$^5$ .......................................... A61B 5/0444
[52] U.S. Cl. ...................................... 128/698; 367/45; 364/724.019
[58] Field of Search .................. 128/662.04, 696, 698, 128/702, 703, 704; 364/724.19, 724.2, 726; 367/38, 45

[56] References Cited

U.S. PATENT DOCUMENTS

| | | | |
|---|---|---|---|
| 4,211,237 | 7/1980 | Nagel | 128/698 |
| 4,421,121 | 12/1983 | Whisler et al. | 128/731 |
| 4,422,459 | 12/1983 | Simson | 128/702 |
| 4,519,396 | 5/1985 | Epstein et al. | 128/698 |
| 4,556,962 | 12/1985 | Widrow | 367/45 |
| 4,630,246 | 12/1986 | Fogler | 367/45 |
| 4,760,540 | 7/1988 | Yuen | 364/724.019 |
| 4,781,200 | 11/1988 | Bailer | 128/698 |
| 4,783,660 | 11/1988 | Plenet | 367/45 |
| 4,807,173 | 2/1989 | Sommen et al. | 364/724.019 |
| 4,945,917 | 8/1990 | Akselrod et al. | 128/698 |

OTHER PUBLICATIONS

Description of a Real-Time System to Extract the Fetal Electrocardiogram, Callaerts et al.-Clinical Physics and Psychological Measurements, vol. 10, Supp. B, 1989, pp. 7-10.
STAN-The Gothenburg Model for Fetal Surveillance During Labor by ST Analysis of the Fetal Electrocardiogram, Rosen et al., Clinical Physics and Psychological Measurements, vol. 10 Supp B 1989 pp. 51-56.
On-Line Algorithm for Signal Separation Based on SVD, Callaerts et al., SVD and Signal Processing, Elsevier Science Publishers B.V. (North Holland), 1988.
An Adaptive On-Line Method for the Extraction of the Complete Fetal Electrocardiogram from Cutaneous Multilead Recordings, Callaerts et al., Journal of Perinatal Medicine vol. 14 (1986) No. 6.
Detection of Weak Foetal Electrocardiograms by Autocorrelation and Crosscorrelation of Envelopes, J. H. Van Bemmel, IEEE Transactions on Biomedical Engineering, vol. BME 15 No. 1, Jan. 1968 pp. 17-23.
Singular Value Decomposition: A Powerful Concept and Tool in Signal Processing, Vandewalle et al. Math- (List continued on next page.).

Primary Examiner—William E. Kamm
Attorney, Agent, or Firm—Varnum, Riddering, Schmidt & Howlett

[57] ABSTRACT

To provide an accurate reproduction of a signal detected in a noisy environment, a primary signal sensor and a plurality of "signal-free" reference sensors are used. Information collected from the primary sensor and the reference sensors is compared to derive correlation data. A matrix, representing correlation data in the time domain or cross-spectral density information in the frequency domain, is constructed based on the computed correlation data. The matrix is transformed to a diagonal matrix using a singular value decomposition algorithm and a threshold value is selected with reference to one of the larger eigenvalues of the diagonalized matrix. Components of the diagonalized matrix are compared to the threshold and values greater than the threshold are used together with primary sensor correlation data to compute Wiener filter constants. The reference sensor outputs are modified by the filter constants and modified sensor outputs are subtracted from the primary sensor output. A noise-cancelled output signal is then synthesized. By selecting an appropriate threshold, the effect of redundant reference sensor contributions and the effect of small primary signal contributions to the reference sensors are eliminated.

26 Claims, 12 Drawing Sheets

OTHER PUBLICATIONS ematics and Signal Processing II, pp. 539-560, Clarendon Press, Oxford 1990.

On-Line Processing of the Fetal Electrocardiogram, A New Direction for Fetal Monitoring, E.M. Symonds, The Journal of Reproductive Medicine, vol. 32, No. 7, 1987.

An On-Line Adaptive Algorithm for Signal Processing Using SVD, Callaerts et al. Signal Processing III, Elsevier Science Publishers B.V. (North Holland) 1986.

Adaptive Noise Cancelling: Principles and Applications, Widrow et al., Proceedings of the IEEE, vol. 63, No. 12, Dec. 1975, pp. 1692-1716.

Adaptive Signal Processing, Widrow et al., Prentice-Hall, Inc., 1985, Chapt. 12.

A New Algorithm for Adaptive Noise Cancellation Using Singular Value Decomposition, Changxiu, Acta Automatica Sinica, vol. 12, No. 2, Apr., 1986, pp. 146-153.

Removing the Maternal Component in the Fetal ECG Using Singular Value Decomposition, van Oosterom et al., Electrocardiology 1983: Proceedings of the Tenth International Congress on Electrocardiology, Bratislava, Czechoslovakia, Aug. 14-19, 1983, pp. 171-176.

Two Methods for Optimal MECG Elimination and FECG Detection from Skin Electrode Signals, Vanderschoot et al., IEEE Transactions on Biomedical Engineering, vol. BME-34, No. 3, Mar., 1987 pp. 233-243.

Extraction of Weak Bioelectrical Signals by Means of Singular Value Decomposition, Vanderschoot et al., Analysis and Optimization of Systems: Proceedings of the Sixth International Conference on Analysis and Optimization of Systems, Nice, Jun. 19-22, 1984, Springer Verlag, Verlin and New York, 1984, pp. 434-448.

A Reliable Method for Fetal ECG Extraction from Abdominal Recordings, Proceedings, Vanderschoot et al., Material Informatics Europe 1984, Brussels, Sep. 10-13, 1984, Springer Verlag, Berlin and New York, 1984, pp. 249-254.

Near-Orthogonal Basis Functions: A Real Time Fetal ECG Technique, Longini et al., IEEE Transactions on Biomedical Engineering, vol. BME-24, No. 1, Jan. 1977, pp. 39-43.

Journal of Perinatal Medicine, Oostendorp et al., vol. 14, No. 6, 1986, pp. 435-444.

Adaptive Filtering in ECG Monitoring of the Fetal Heart Rate, Frank et al., J. Electrocardiology Supplemental Issue, Oct. 1987, pp. 108-113.

The Intrinsic Component Theory of Electrocardiography, Young et al., IRE Transactions on Bio-Medical Electronics, Oct., pp. 214-221.

Comparison of SVD Methods to Extract the Foetal Electrocardiogram from Cutaneous Electrode Signals, D. Callaerts et al., Med. & Biol. Eng. & Comput., 1990, 28, pp. 217-224.

METHOD AND APPARATUS FOR DETECTING A SIGNAL FROM A NOISY ENVIRONMENT AND FETAL HEARTBEAT OBTAINING METHOD

CROSS REFERENCE TO RELATED APPLICATION

This is a continuation-in-part of application Ser. No. 07/508,304 filed Apr. 12, 1990, now abandoned.

BACKGROUND OF THE INVENTION

The present invention relates to cancellation of noise signals from a detected signal and more particularly relates to cancellation of unknown noise using a plurality of reference sensors.

The problem of obtaining a true representation of a source signal occurring in a noisy environment occurs in a variety of circumstances, for example in the detection of sonar or seismographic signals and in the detection of a fetal electrocardiogram in the presence of maternal "noise" signals. It is known in the art that unwanted noise detected by a primary sensor can be mitigated by the use of so-called "signal-free" reference sensors, which receive only the noise and not the signal. The output of the signal-free reference sensors is used in conjunction with the output of the primary sensor to derive filter constants which are used to remove the noise components from the output of the primary sensor. It has been recognized that it is advantageous to use more than a single reference sensor when there is more than a single independent source of noise to be cancelled. It has also been recognized, however, that there is a limit on the number of reference sensors that can be used. It is a problem in the art that there is no known method for ascertaining the precise number of reference sensors that will provide cancellation of all significant noise components of the primary sensor output without compromising the integrity of the signal to be detected. Furthermore, under most circumstances it is not possible to obtain a reference sensor reading which is totally free of the primary signal. Known noise-cancelling techniques have a tendency to amplify the effects of small amounts of a primary signal which are detected by the reference sensors to the point of cancelling the signal to be detected.

One prior art publication by Widrow et al. entitled "Adaptive Noise Cancelling: Principles and Applications" proceedings of the IEEE, Volume 63, No. 12, December 1975, describes an arrangement for cancelling noise by the use of a primary sensor and one or more signal-free reference sensors in the generation of a fetal electrocardiogram. Each reference sensor output is used, together with primary sensor information, for determining constants for the so-called Wiener filter. The Wiener filter is used to filter the references prior to subtracting the filtered reference outputs from the primary output in order to generate a representation of the true signal without the undesired components. Widrow et al. use the Wiener filter on each of the references separately in an attempt to remove from the primary sensor output signal components identified from the outputs of the signal-free reference sensors. Widrow et al. indicate that it is not clear how many of the signal-free reference sensors should be used. One problem in the art is that if too few references are used, not all significant noise components will be removed from the signal. A specific problem of the prior approaches is that if more references are used than there are independent noise sources, the Wiener filter algorithm receives too much mutually coherent reference sensor information, and matrices used in the computation of the filter constants become ill-conditioned or rank deficient. This results in poorly defined filter constants or causes the computation to break down completely. Another problem with this prior art approach is that in practice, the so-called signal-free references may in fact be influenced by the primary signal to be detected. The effect of even a small amount of such a signal used in the Wiener filter process may cause the true signal to be cancelled along with the noise, since the purpose of that filter is to remove from the signal all components detected by the reference sensors. The need for a fetal electrocardiogram has been long recognized by doctors, for example, for proper diagnosis of fetal arrhythmia or other fetal cardiac abnormalities. However, no reliable device for the generation of fetal electrocardiograms has been developed in the prior art.

Another prior art publication by Cao Changxiu entitled "A New Algorithm for Adaptive Noise Cancellation Using Singular Value Decomposition" Acta Automatica Sinica Volume 12, No. 2, April 1986, describes a noise-cancelling method using a single reference sensor. The output of this sensor is passed through one or more time delays to make it available over varying time intervals. The values so obtained are configured in a matrix and singular value decomposition is proposed to reduce the matrix, treating certain values as zero. This publication deals with statistical dependence or independence of a single sensor output when examined over several time intervals. It does not address the problem of excessive mutually coherent information coming from several reference sensors used to detect a plurality of noise sources.

Other prior art references such as a publication by van Oosterom et al. entitled "Removing the Maternal Component in the Fetal ECG Using Singular Value Decomposition" Electrocardiology '83: Proceedings of the 10th International Congress on Electrocardiology, Bratislava, Czechoslovakia, Aug. 14, 1983, are concerned with the application of singular value decomposition to noise cancelling in a multi-reference environment. That publication proposes applying the singular value decomposition technique to a matrix of computed values derived both from the primary sensor output and outputs from a plurality of references. One problem with this prior art approach is that it is difficult to predict which of the values resulting from the singular value decomposition are derived from the primary source and which are derived from the reference sources. No precise way of separating the primary signal contribution from the reference signal contributions is proposed in the publication.

Another prior art publication, authored by Longini et al. entitled "Near-Orthogonal Basis Functions: A Real Time Fetal ECG Technique", IEEE Transactions on Biomedical Engineering, Volume BME-24, No. 1, January 1977, discusses the application of orthogonal basis functions to a reference matrix of values derived from signals from a plurality of reference sources. One problem with this prior art approach is that it does not deal with the problems resulting from the inclusion of small amounts of the primary signal in the reference signals or excessive mutually coherent information from several reference sensors.

SUMMARY OF THE INVENTION

These and other problems of the prior art are overcome in accordance with the present invention in an arrangement employing at least one primary signal detector and a number of "signal-free" reference signal detectors, by eliminating the detrimental effects resulting from the inclusion of certain amounts of the primary signal in the "signal-free" reference sensor outputs and eliminating reference sensor contributions which do not represent independent noise sources, prior to determining filter constants. The filter constants are used to condition the reference outputs before they are subtracted from the primary sensor output to generate a noise-cancelled output signal. In accordance with one aspect of the invention, the computation of filtering constants to be used in the filtering algorithm involves setting thresholds on the computation process and eliminating from the computation values falling below the threshold. Advantageously, in accordance with this invention, the number of reference sensors selected can be safely increased to where no additional possible noise sources might be included as a result of adding another reference. A further advantageous result is that this invention avoids inadvertent cancellation of major signal components due to inclusion of small amounts of the true signal in the reference sensor outputs and the uncertainty of results in the prior art when more reference detectors are used than there are actual noise sources.

In accordance with one aspect of the invention, an output signal representative of the primary source signal to be detected is generated by deriving correlation data for the several reference outputs and using the correlation data to generate information defining filter constants representing certain linear combinations of reference outputs. Only those source contributions to reference sensors for which correlation values exceed a predetermined threshold value are taken into account in defining the filter constants. Contributions falling below the threshold are eliminated from consideration. The filter constants are applied to the reference outputs, and the filtered reference outputs are subtracted from the primary output in order to remove the effect of noise sources from the primary output. Correlation data of small magnitude, when compared to other correlation data values, may be eliminated from the filter constant computation process, since the small value data do not represent any independent noise sources. Furthermore, primary source signal values included in small value correlation data, where such signal values may have significant influence, are advantageously eliminated.

In one specific embodiment of the invention, a primary source detector and a plurality of reference detectors are used to generate a noise-corrected sonar hydrophone output. A large number of reference detectors are used to assure that all significant noise sources are detected and detector signal contributions which do not represent independent noise sources are eliminated. Cross-correlation data based on signals received from the various reference detectors is used to construct a cross-spectral density matrix. Using a known orthogonalization procedure, the matrix is solved and eigenvalues of the reduced matrix falling below a predetermined threshold value are eliminated, thereby eliminating reference signal contributions from the primary signal source and from reference sensors not representing independent noise sources. The remaining values of the reduced matrix are used in combination with reference-to-primary sensor correlation data to define filter constants. The filter constants are applied to power-spectral density data pertaining to the reference sensors in a known manner in order to remove signal contributions equivalent to those detected by the reference sensors. Advantageously, using a large number of reference detectors and eliminating those signal contributions which do not represent independent noise sources provides greatly improved output signals for sonar detection and for other applications where a primary signal is present in the presence of a variety of noise sources.

In another embodiment of the invention, the invention is employed in the generation of a fetal electrocardiogram representative of the true cardiac activity of the fetus. In this embodiment, a plurality of primary sensors are used in the abdominal area of a pregnant woman to generate a plurality of traces for a fetal electrocardiogram. A relatively large number of reference sensors are positioned in other areas of the woman's body to detect noise resulting from the heartbeat of the woman and other noise sources. The outputs from the reference sensors and the primary sensors are multiplexed and applied to a digital computer, where a cross-correlation matrix is constructed defining cross-correlation values based on the outputs of the reference sensors. The matrix is solved using a known singular value decomposition technique and correlation values below a predetermined threshold are eliminated. The remaining values of the reduced matrix are used to define filter constants which are applied to the reference sensor outputs and the filtered outputs are subtracted from the primary sensor outputs to define the fetal heartbeat signals. The computer synthesizes fetal output signals and applies the synthesized output signals to an electrocardiograph output or other recording device, to produce a fetal electrocardiogram. Advantageously, as many sensors as desired may be used in an environment where it is not known how many noise sources will influence a signal, since redundancy of the reference sensor outputs is eliminated by this invention.

In accordance with this invention, a noise-cancelled output signal may be generated by storing a data record of signal values representative of detected primary output signals and reference output signals, converting the stored data to frequency domain signal values, generating filter constants in terms of frequency domain values and apply the frequency domain filter constants to signal values of the data record transformed into the frequency domain and transforming the resultant values to the time domain. Advantageously, this method provides a noise-cancelled output signal in terms of time domain values while employing the advantages of frequency domain computational operations.

The invention may advantageously be employed in a variety of noise-cancellation applications where a primary signal is to be detected in the presence of multiple noise sources or noise modes beyond the exemplary applications discussed herein. The invention may, for example, be advantageously used in heart transplant electrocardiography to generate an electrocardiogram of nerve center activity of the old heart in the presence of much stronger signals from the transplanted heart. Other areas of application for the invention include such areas as sound detection, telephony, radar, television, etc., wherein a signal is to be detected in a noisy environment. The invention may also be advantageously used in active noise cancellation wherein a detected noise signal is cancelled by a synthesized complementary signal.

BRIEF DESCRIPTION OF THE DRAWINGS

The invention is described with reference to the drawings in which:

FIGS. 4, 4A, 5 and 5A are representations of matrices used in the computation of the synthesized waveforms;

DETAILED DESCRIPTION

Figure 1:
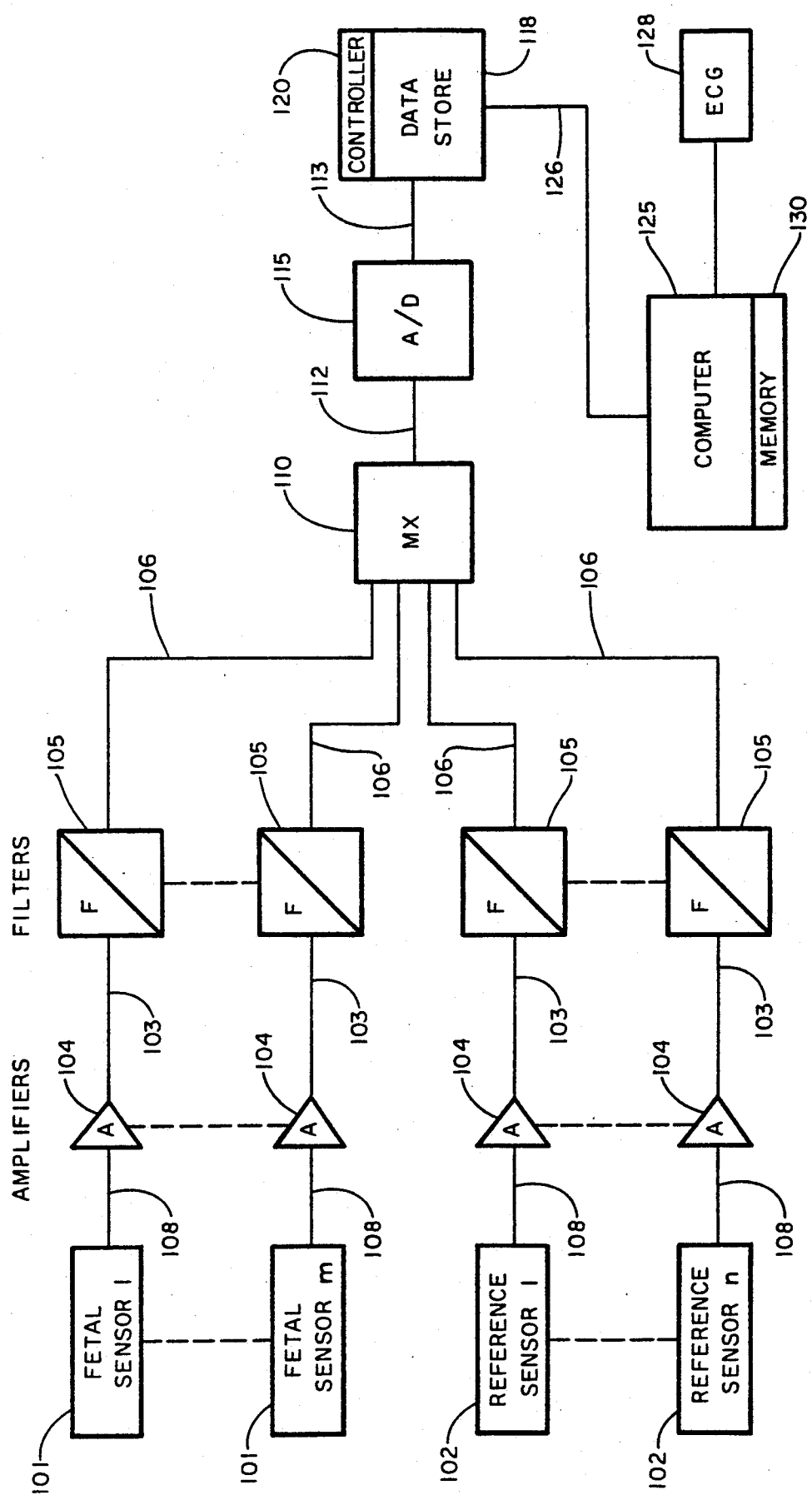
FIG. 1 is a block diagram representation of an illustrative system for generating a fetal electrocardiogram employing one or more fetal sensors and a plurality of reference sensors and a computer for synthesizing a waveform representative of fetal heart activity.

FIG. 1 is a block diagram representation of an arrangement for producing a fetal electrocardiogram. The system includes a plurality (m) fetal sensors 101, placed in the abdominal region of a pregnant female, to detect the fetal heartbeat signals which are to be reproduced in the electrocardiogram. The number of primary sensors equals the number of independent fetal signal indications desired for the electrocardiogram. The system employs a plurality (n) reference sensors 102. By way of example, 10 reference sensors may be placed on various parts of the body of the woman away from the abdominal region. These reference signals will be used to detect independent noise sources within the female body and the environment in which the recording of the electrocardiogram takes place. The exact number of reference sensors 102 is not-critical, as long as enough sensors are used to detect the significant independent noise sources influencing the output of the fetal sensors 101. The greater the number of references, however, the greater will be the computer computation time for noise cancelling. Major noise sources to be detected stem from the activity of the maternal heart. Other sources may include physiological signals stemming from other muscular actions such as breathing or the like. The noise sources may also be expected to include electrical line noise, instrumentation error, etc. Each of the fetal sensors 101 and the reference sensors 102 will pick up some linear combination of all of the many sources. In the system according to the invention, a signal for each of the fetal sensors 101 is computed, by means of computer 125, with reference to all of the reference sensors but independent of the other of the fetal sensors. In a typical situation, one of the fetal sensors 101 in the abdominal area may receive a signal on the order of 20 percent which results from the fetal heartbeat and 80 percent from other sources, mostly the maternal heartbeat. In the generation of the final output signal, the output of one of the fetal sensors will be modified taking into account the composite effect of all of the outputs of the reference sensors 102, but not including the least significant linear combinations of the reference sensor outputs.

The fetal sensors 101 and reference sensors 102 may be commercially available sensors typically used in the production of electrocardiograms. The signals detected by each of the sensors 101 and 102 are transmitted to amplifiers 104 via conductors 108 and amplified by means of amplifiers 104. These are preferably well-known, variable-gain amplifiers used to provide a calibrated amplified signal to the system. Amplifiers 104 are connected to filters 105 by means of conductors 103. Filters 105, which are well-known, low-frequency band-pass filters, are provided in order to avoid disturbances due to aliasing of higher frequency signals. Filters 105 are connected to a well-known multiplex circuit 110 via conductors 106. The analog filter outputs are multiplexed and transmitted to a well-known analog-digital (A-to-D) convertor 115 via conductor 112. The A-to-D convertor will convert the multiplexed analog information to digital data words at a specified sampling rate, e.g., 256 waveform samples per second. The digital data generated by the A-to-D convertor 115 is transmitted via conductor 113 to a data store 118. The data store 118 includes a controller 120 which controls the storing of the data from the sensors in a file together with header information identifying the patient, time of recordation, etc. Controller 120 arranges the multiplexed digital sensor information in data records which are read from the data store 118 by computer 125 via bus 126, and operated upon by the computer to define a synthesized output signal representative of the fetal heartbeat. The computer 125 controls graphics printer 128 to generate the desired fetal electrocardiogram.

The computer 125 performs noise cancelling to generate a synthesized output signal for each of the fetal sensors 101. Noise cancelling removes from the outputs of the fetal sensors 101 specific signal components computed on the basis of the outputs from the plurality of reference sensors 102 without being affected by redundant reference outputs. Noise cancelling may be done either in the frequency domain or in the time domain. In the frequency domain, time-averaged sensor outputs are transformed, for example, by means of Fast Fourier Transforms into the frequency domain, and a matrix of cross-spectral densities of the sensor outputs is constructed in a well-known manner. Such a matrix is known to possess so-called Hermitian symmetry. In time domain, reference sensor outputs are used to construct a matrix of correlation values in a well-known manner. The matrix records correlations between, for example, output of a sensor A at time t and output of another sensor B, taken a time delay tau later. Thus, signal components first appear at sensor A and later appearing at sensor B will be reflected in the correlation matrix.

Figure 2:
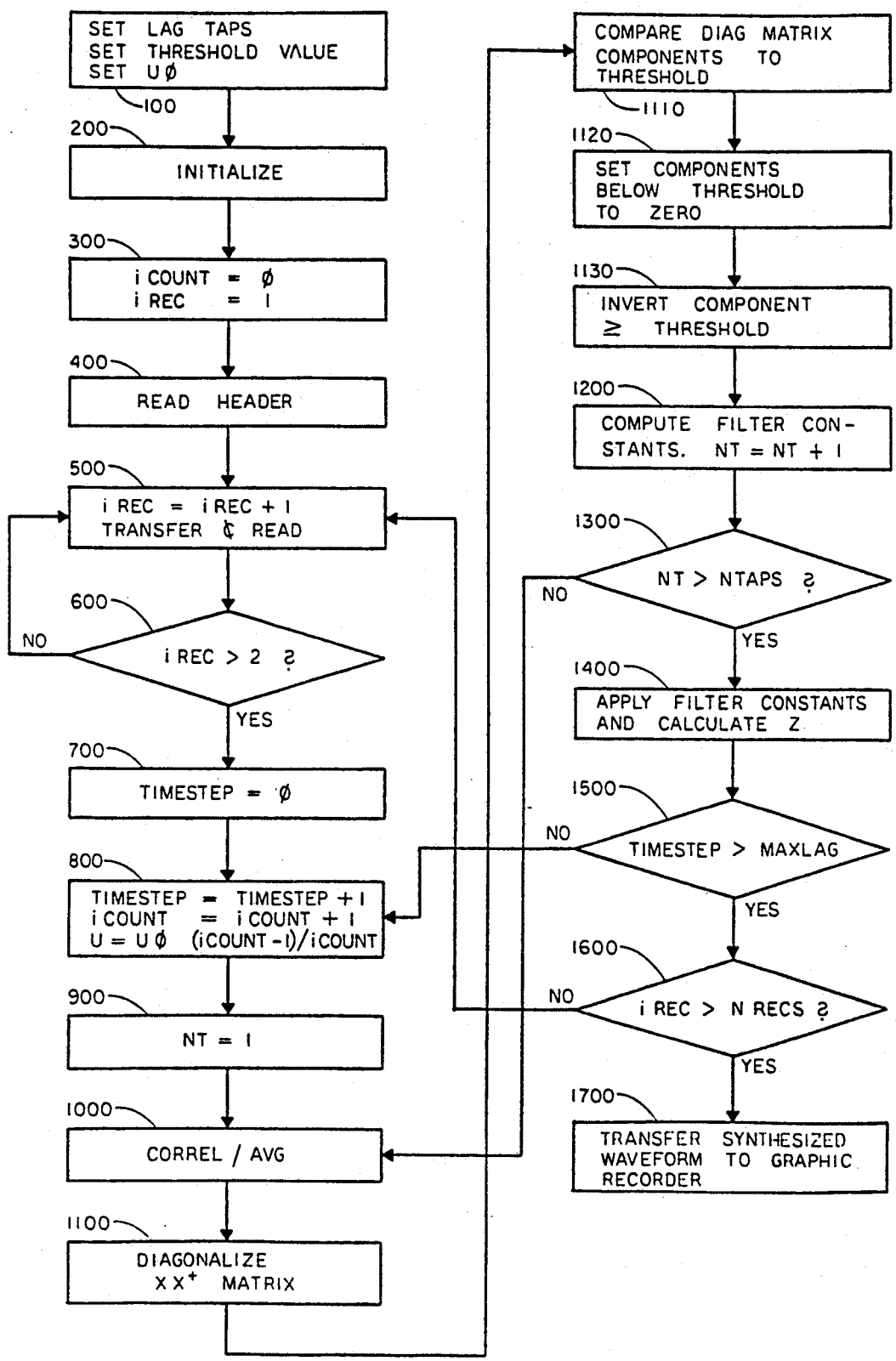
FIGS. 2 and 2A are illustrative flow chart diagrams representing functions executed by the computer of FIG. 1.

FIG. 2 is a flow chart representing steps taken by computer 125 in generating a fetal electrocardiogram using time domain analysis. The data stored in the data store 118 comprises several records of data for each of the sensors covering several time periods. The computer 125 reads a record including data for one of the m fetal sensors 101 and for all of the n reference sensors 102 for a specific time period. Each such record comprises several time slices, e.g., 256 sampling times per second. The computer computes filter constants on the basis of correlations among the reference sensor outputs for a number of time delays. A correlation matrix is constructed for each time delay, and using the singular value decomposition technique, the matrix is reduced to a diagonal form, with the singular values appearing on the diagonal. The resultant singular value components are then compared to a threshold value and low-value components are eliminated. The combined filter constants are applied to the stored reference outputs which are subtracted from one of the fetal sensor outputs in order to generate a signal component for the time period covered by the computation. Thereafter, the process is repeated for each of a number of timesteps until fetal signal components for each of the timesteps in a record, which may cover, for example, ten seconds of time, have been computed. A noise-cancelled fetal output signal for the selected fetal sensor is synthesized accordingly. This process is repeated for each of the fetal sensors.

FIG. 2, at block 100, shows the setting of lag taps. The lag taps define the time period to be used in determining correlation among the outputs of the selected primary sensor and reference sensors 1 through n. For example, if the waveform is sampled at the A-to-D convertor 115 at the rate of 256 samples per second, taps may be spaced linearly over the period of one second, taken, for example, every 20th reading, or log-periodically, for example, 1, 2, 4, 8, 16 . . . . Other values may be selected, depending to some extent on the variation expected in the signal over time. Block 100 further indicates the setting of threshold values to be used in eliminating singular value components of low value after decomposition of the correlation matrix. Thresholds are defined in terms of the largest singular value in the matrix after decomposition. It may, for example, be set at one percent of the largest value ($-20$ dB) or at 0.01 percent ($-40$ dB). If the threshold is set too low, the probability of including small components of the true signal is increased. If it is set too high, significant noise sources may be excluded from the noise cancellation algorithm. Block 100 also indicates setting a value of U0. In this illustrative embodiment, the Wiener filter algorithm is used to perform noise cancellation. Constants for the Wiener filter may be calculated adaptively employing a damping process. One way to control the adaptive damping process is to update the correlations in block 1000 each timestep by use of a moving average which controls the amount of history which is retained. In this illustrative embodiment, the damping constant U·U0 (icount$-$1) / icount. The value U0 is set in block 100 in this illustrative embodiment to 0.1. The value of icount is incremented each time computations of filter constants is initiated for a different timestep. Alternatively, the Wiener filter constants may be generated in a nonadaptive manner by computing a fixed set of averages of the correlations for all timesteps and using these to construct a single set of Wiener filters.

In block 200 of FIG. 2, the memory to be used for correlation matrices is set to zero to avoid computational errors. In block 300, counters in the program are initialized. Block 400 indicates the reading of record header information from the data store which includes patient identification, number of references recorded, etc. In block 500 a first data record is read from the data store 118. The record includes data gathered over a number (e.g., 256) timesteps from reference sensors 1 through n shown at 102 in FIG. 1 and one of the fetal sensors. A first such record is read into a one-area memory referred to as an upper array. By means of decision block 600, a loop is made back to block 500 to transfer the priorly read record to a lower memory array and to read a second record into the upper array.

Figure 3:
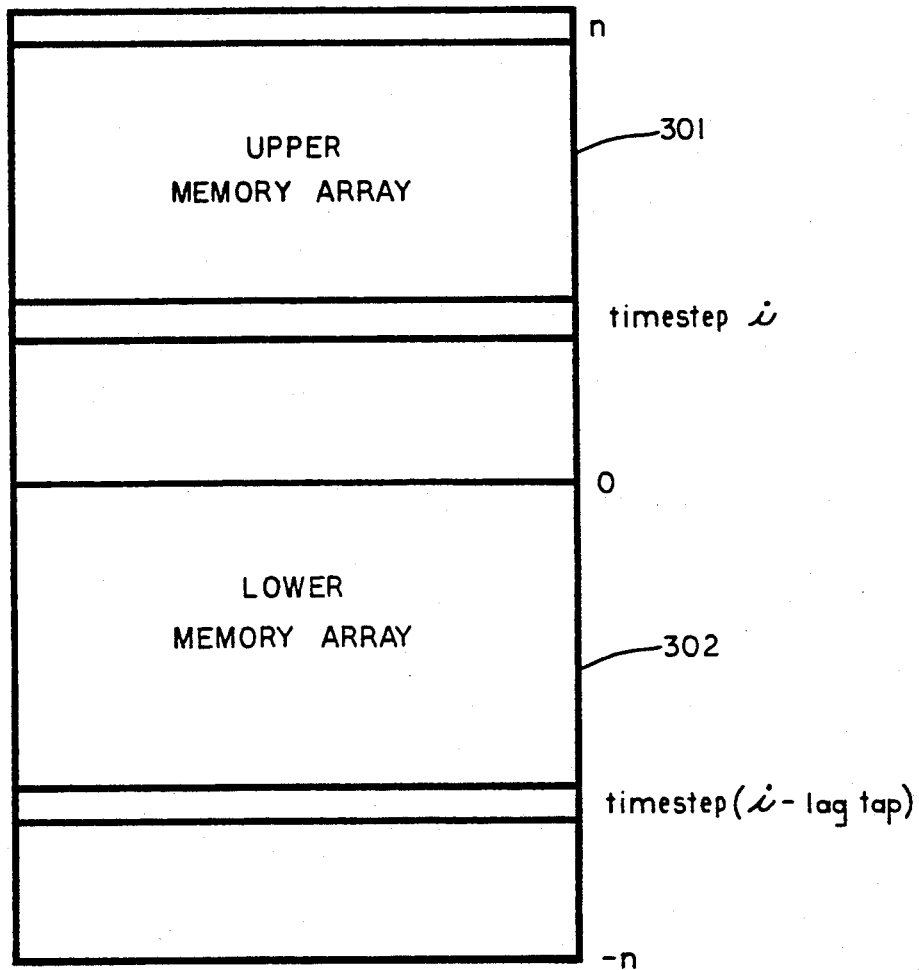
FIG. 3 is a block diagram representation of a memory array used by the computer of FIG. 1.

FIG. 3 is a representation of upper and lower memory arrays in memory 130. In block 500, the information from the upper array is transferred into the lower array and a record is read into the upper array 301. This step is executed a second time by return from block 600 to block 500 to move the first record into the lower memory array and read a second record into the upper memory array. A record may, for example, include collected information corresponding to one second of time. At a sampling rate of 256 hertz at the analog-to-digital convertor 115, one second of data comprises 256 timesteps. Correlation data and filter constants are computed in blocks 1000 through 1200 for each such timestep using the lag taps set in block 100 in order to generate correlation data based on a comparison of data in the upper memory array, for example, at timestep i with data occurring a period equivalent to lag tap earlier. The earlier data may occur in the same record (i.e., in the upper memory array 301) or in the earlier record (i.e., in the lower memory array 302).

Figures 4, 5:
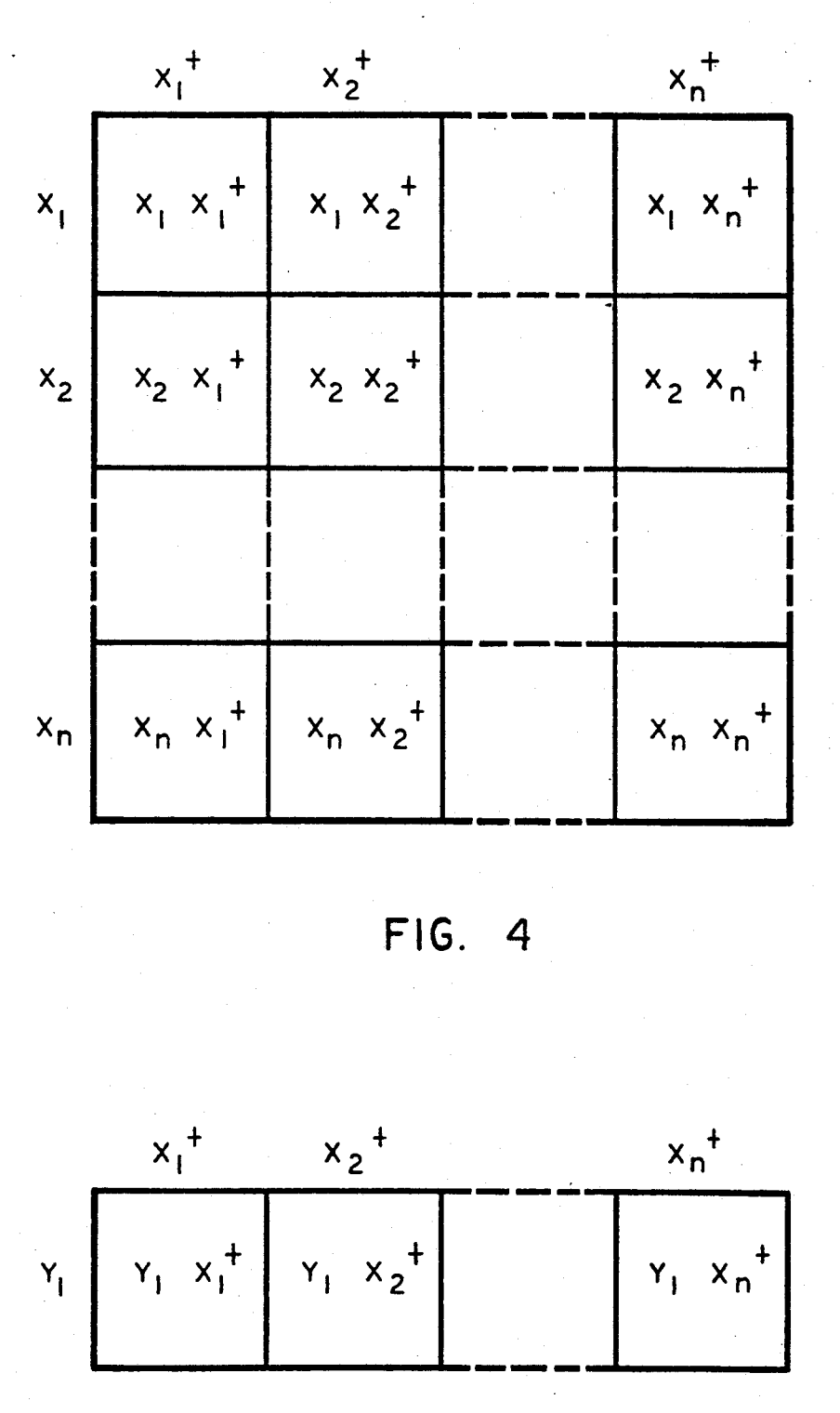

In block 700, a value referred to as timestep is initialized for later use. An advance is made to block 800 where the value timestep is incremented to keep track of the timestep of the current record for which a signal component is computed. In block 800, the value of icount is incremented and a damping constant U is computed. Upon the first entry into block 800, the damping constant is zero, since there is no history to use in a moving average. The value of icount is incremented in block 800 such that the moving average will be modified each time block 800 is entered, i.e., each time a new timestep is selected. From block 800, an advance is made to block 900 and a counter nt is set equal to one prior to executing the loop defined by blocks 1000 to 1300. In block 1000, a correlation matrix is generated showing correlation between each of the references at a specified time and all of the other references at a point in time defined by the lag taps initiated in block 100. FIG. 4 is a representation of a reference output correlation matrix for n separate references $X_1$ through $X_n$, showing the correlation of each reference output at a point in time with itself and all other references at a point in time shown symbolically as $X^+$. The values of $XX^+$ may be averaged using the moving average defined by the value of u specified in block 800. FIG. 5 shows a matrix of correlation of output values of one of the fetal sensors with outputs of each of the reference sensors $X_1$ through $X_n$. After computation of the correlation matrices, advance is made to block 1100 where the matrix of reference correlation values, generated in block 1000 is diagonalized. In this illustrative embodiment, the singular value decomposition process, which is a well-known process described in mathematical texts, is used to reduce the matrix to a singular value diagonal matrix. Other known techniques, such as the so-called Gram-Schmidt procedure, are available for matrix decomposition. In block 1110, all components of the singular value diagonal matrix are compared against the threshold set in block 100, e.g., one percent of the largest component present in the diagonal matrix. In block 1120, all components below the threshold are set to zero. This excludes from the filtering process those components representing mutually coherent noise sources and those low-value components which include a component of the primary signal. The latter would cause cancellation of the corresponding primary signal component if included in the application of the unconstrained Wiener filter algorithm. In block 1130, the remaining matrix components, i.e., those greater than or equal to the threshold, are inverted to derive the pseudo-inverse of the diagonalized matrix. In block 1200, the pseudo-inverse values are used together with the YX+ matrix values to compute the Wiener filter constants.

The steps of constructing correlation matrices and computing filter constants as outlined above with respect to blocks 1000, 1100, 1110, 1120, 1130 and 1200 is performed with respect to each of the lag taps set in block 100. The value nt, if less than the total number ntaps of taps used, is incremented in block 1200, and a test is made in block 1300 to determine whether the value of ntaps has been exceeded. If not, additional filter constants will be calculated for another tap by returning to block 1000. If value of ntaps has been exceeded, an advance will be made to block 1400 where the filter constants computed in block 1200 for each tap are applied to the reference sensor outputs, and filtered reference outputs are subtracted from the output of the primary sensor under consideration. In this manner, a noise-cancelled fetal output signal is generated for a selected one of the fetal sensors 102 for one timestep.

If the test in block 1500 indicates that additional timesteps are to be handled, a return is made to block 800 where timestep and icount are incremented. A new moving average is also computed using an incremented value of icount. Thereafter a transfer is made to block 900 and new filter constants are computed for the same lag taps used for the previous timestep, and a signal is again calculated using the selected filter algorithm as indicated in block 1400. This sequence is repeated until all timesteps for the record read into the upper memory array in block 500 have been handled. Thereafter, in block 1600 a test is made to determine whether additional records are to be read. If so, the previous record will be transferred from the upper memory array to the lower memory array, and a new record will be read into the upper array. When all selected records have been handled, the values for Z computed in block 1400 are transmitted by the computer as a synthesized waveform to the graphic recorder for production of an electrocardiogram. The process of FIG. 2 is repeated for each of the m fetal sensors 101 in order to generate m electrocardiogram output traces.

Figure 2A:
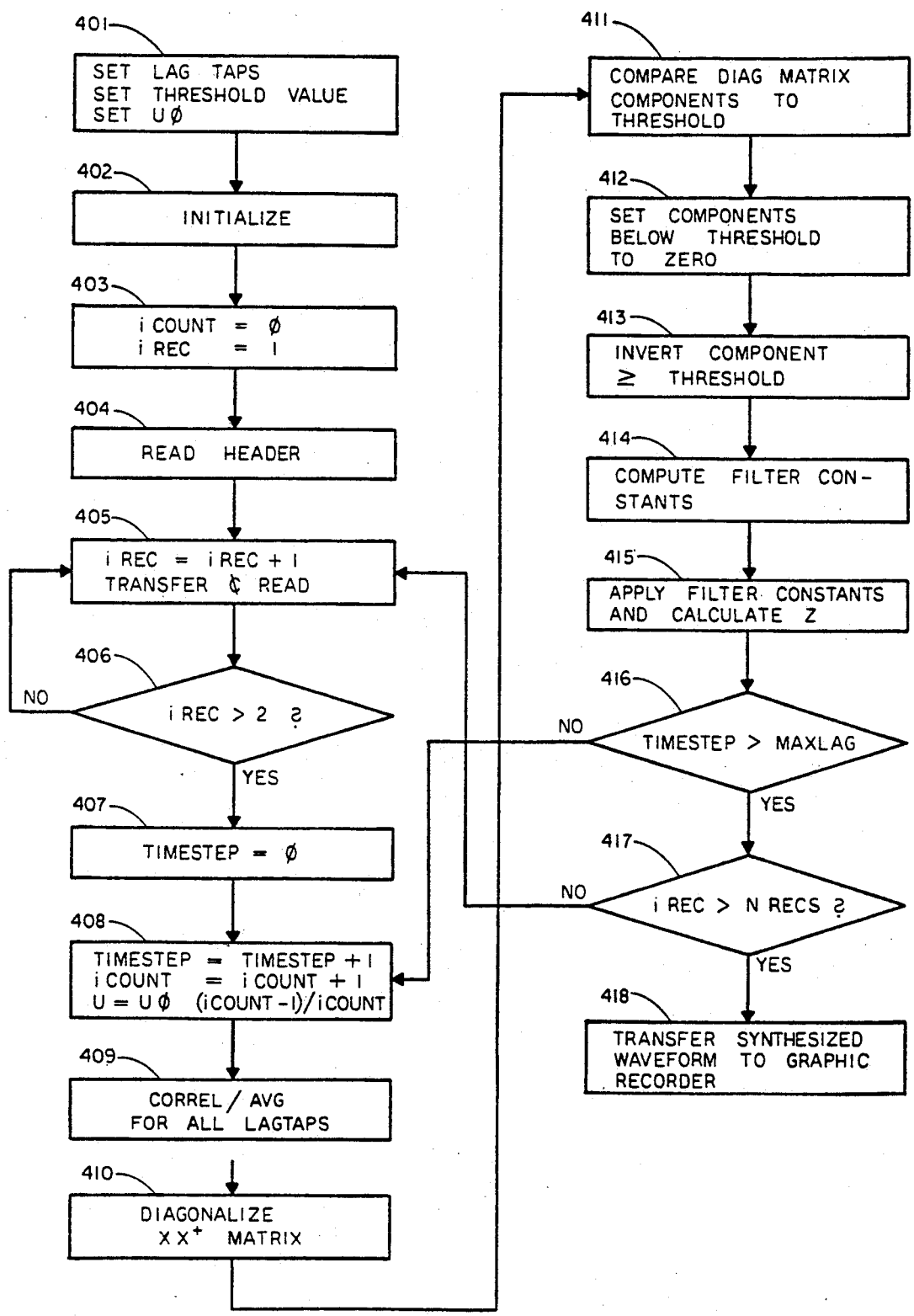

As is apparent from the above discussion, in FIG. 2 a correlation matrix is generated for one particular time delay or lag tap as represented by block 1000. In blocks 1100, 1110, 1120, 1130 and 1200, necessary steps are performed to compute and apply filter constants using the correlation matrix generated for the particular lag tap. These steps are repeated until filter constants have been computed and applied for each of the lag taps. FIG. 2A is a flow chart representation of a preferred method of generating an output waveform using time domain analysis in which a correlation matrix is constructed for a plurality of lag taps and filter constants for a timestep, which includes a plurality of lag taps, are computed before the filter constants are applied to the sensor outputs. This method has been found to yield a substantially better result than the method depicted in FIG. 2. In FIG. 2A, the functions performed in blocks 401 through 408 correspond directly to those performed in blocks 100, 200, 300, 400, 500, 600, 700 and 800 of FIG. 2, respectively. In the preferred method of FIG. 2A, an expanded correlation matrix is computed for all lag taps or time delay values in block 409 and filter constants are computed in blocks 410 through 414 based on the expanded correlation matrix generated in block 409. The functions performed in blocks 410 through 414 correspond directly to those described with respect to blocks 1100, 1110, 1120, 1130 and 1200, respectively, of FIG. 2. In blocks 415 through 418, the functions described with respect to blocks 1400, 1500, 1600 and 1700, respectively, are performed.

Figure 4A:
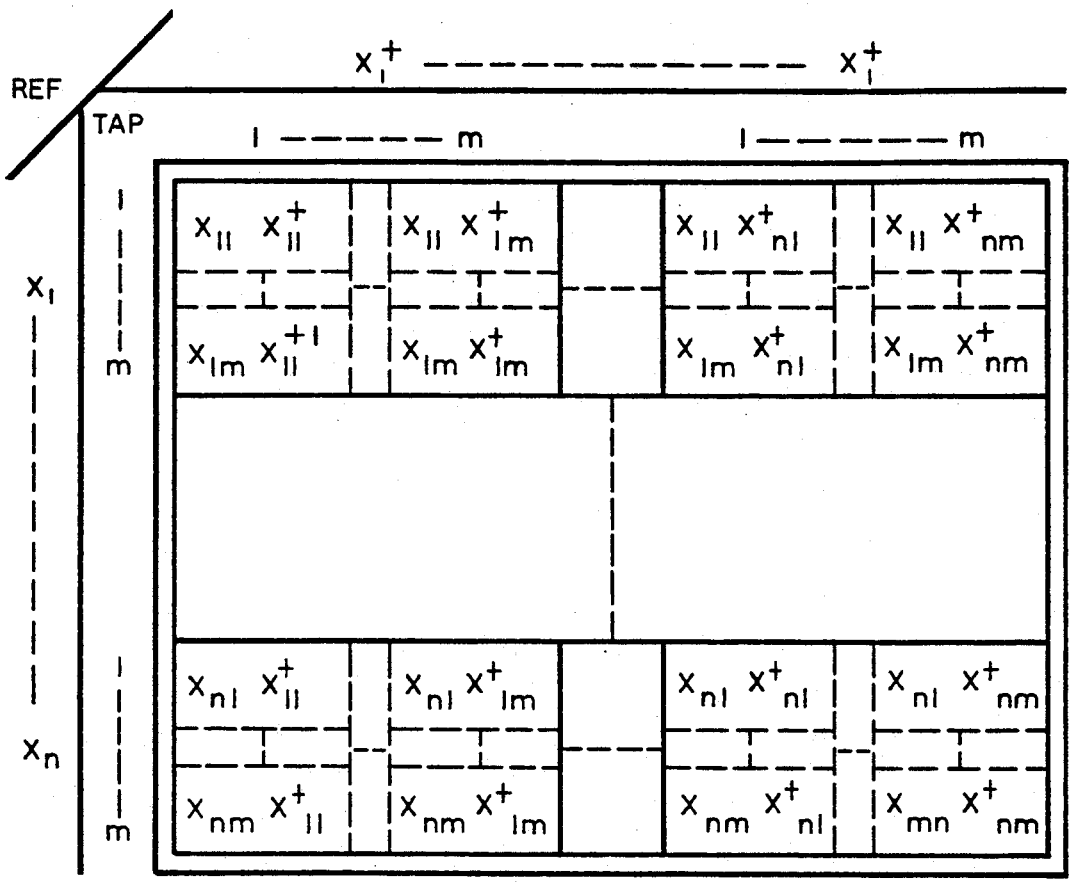
Figure 5A:
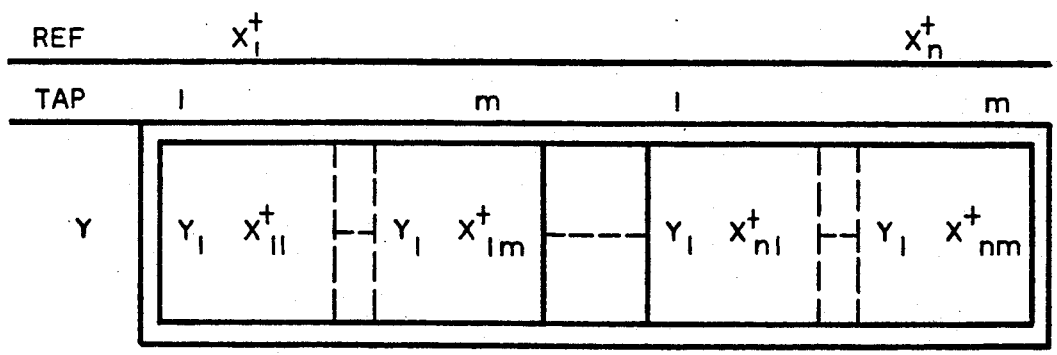

FIG. 4A is a representation of an expanded reference correlation matrix, as generated in block 409, for n separate references, $X_1$ through $X_n$. The correlation of each reference with itself and all other references is shown symbolically as $X_1^+$ through $X_n^+$. The matrix represents correlation values of $XX^+$ at m separate delay times. By way of example, value $X_{11}$ followed by an $X_{nm}^+$ represents the correlation value of reference 1 at delay time 1 with reference n at delay time m. FIG. 5A represents a matrix of correlation output values of one of the fetal sensors Y with outputs of each of the reference sensors $X_1$ through $X_n$ at m delay times.

Figure 6:
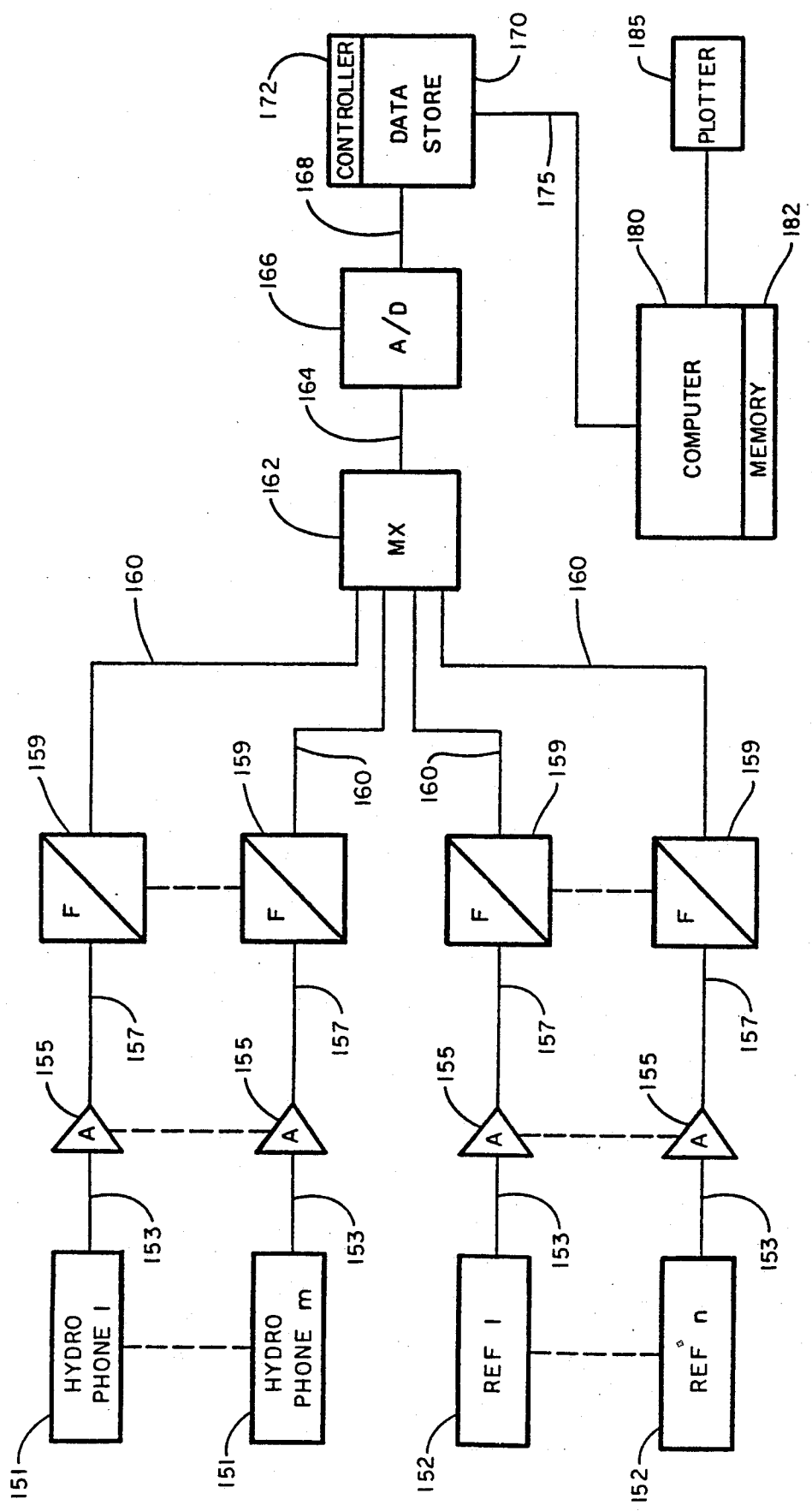
FIG. 6 is a block diagram representation of an illustrative system for generating a graph of a detected underwater signal, employing one or more hydrophones and a plurality of reference sensors and including a computer for synthesizing waveforms.

FIG. 6 is a block diagram representation of an illustrative embodiment of a system for performing noise cancellation on an underwater signal and for generating a graphical representation of the signal. A plurality of m hydrophones 151 may be used in order to produce representations of the signal at different locations. A plurality of n reference sensors 152 are employed to provide reference sensor outputs used in the noise cancelling. The hydrophones 151 and reference sensors 152 are each connected to an amplifier 155 via a conductor 153. The amplifiers are preferably variable-gain amplifiers for calibrating the output signals. The amplified signal is filtered by means of filters 159 connected to the amplifiers 155 by conductors 157. Filters 159 are preferably low-frequency band-pass filters used to prevent aliasing of high-frequency signals. The filters 159 are connected via conductors 160 to a multiplex circuit 162 in which the filtered analog signals are multiplexed and the multiplex output signal is transmitted to an analog-to-digital convertor 166 via conductor 164. The digital data output representing multiplexed hydrophone and reference sensor outputs is transmitted to a data store 170 via conductor 168. The data store 170 includes a controller 172. The controller stores the data in the data store 170 in the form of data records, wherein each record includes a header identifying the operational conditions, the number of associated records, etc., and each record contains a component of the output of one of the hydrophones 151 and of outputs of each of the reference sensors 152. A computer 180 is used in the noise-cancelling operation. It reads records of data from the head data store by data bus 175 and stores such records in its memory 182 for analysis purposes. Data representing a synthesized output signal is transmitted to a plotter 185 to produce an output graph.

Figure 7A:
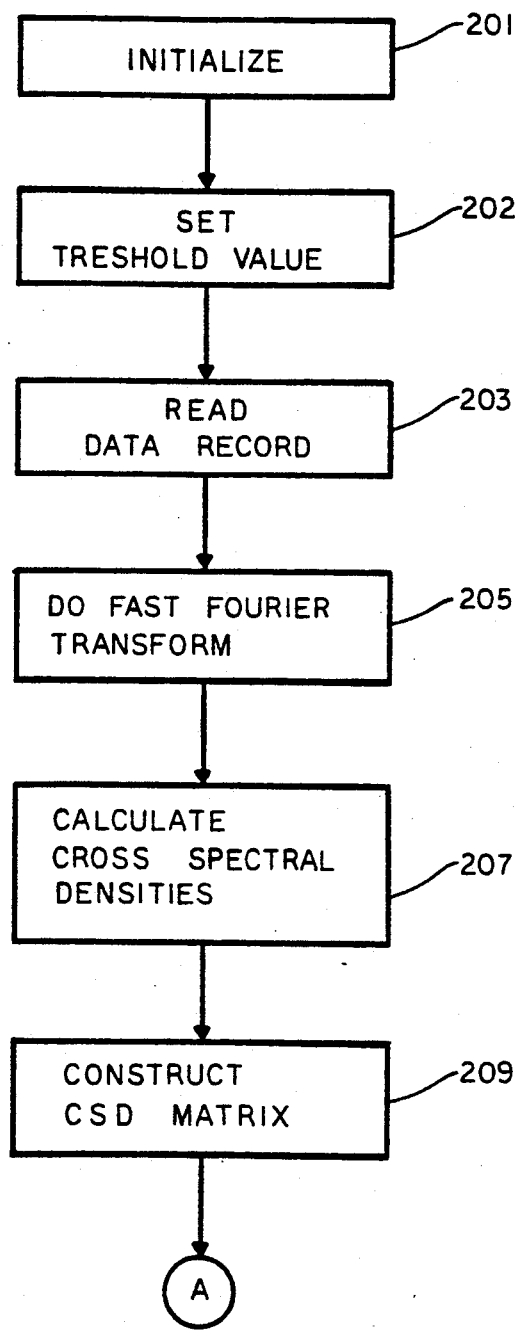
FIGS. 7A, 7B and 7C are illustrative flow chart representations of functions executed by the computer of FIG. 6 in the generation of the synthesized waveforms.
Figure 7B:
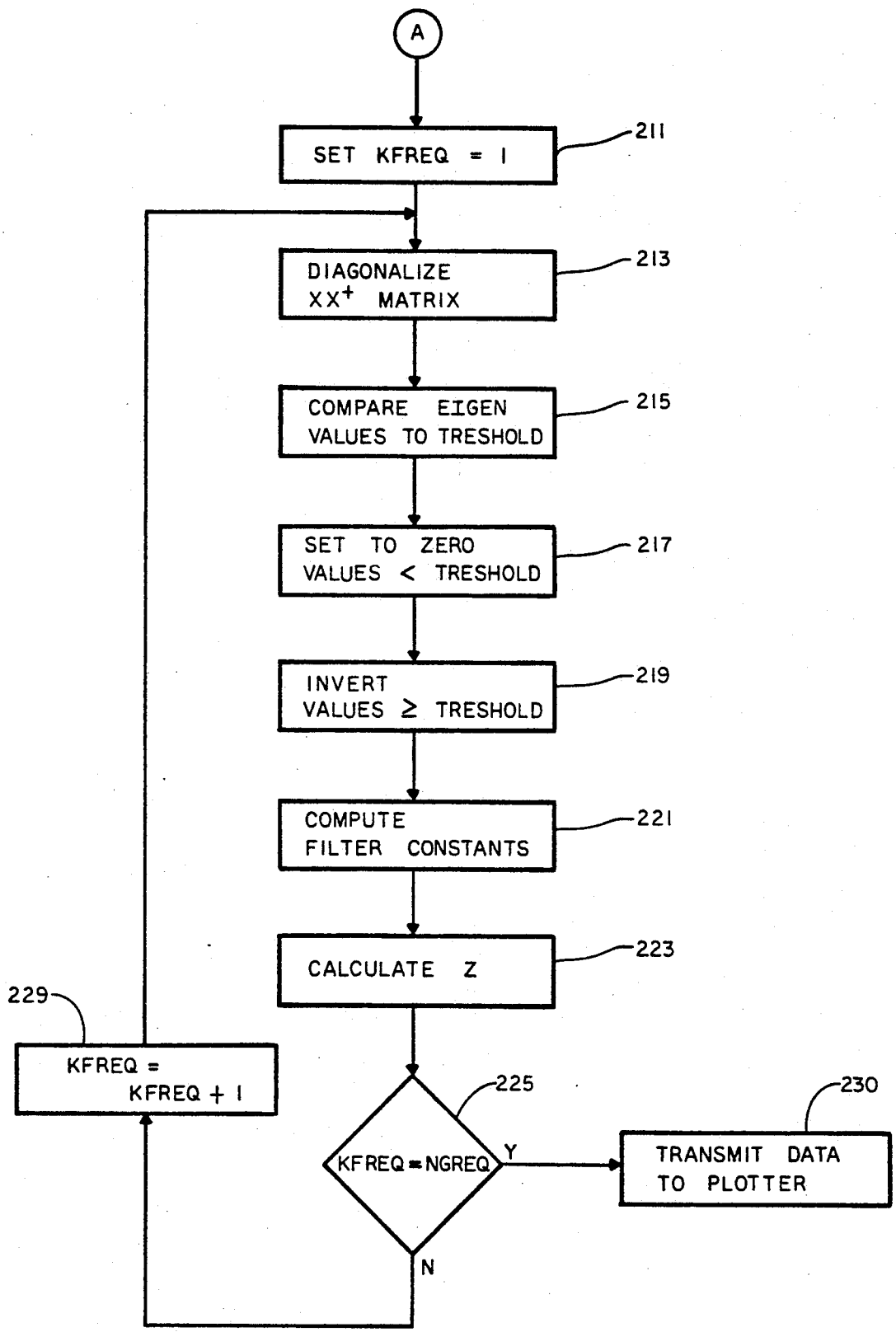

FIGS. 7A and 7B form a flow chart representation of an illustrative set of functions performed by the computer 180 in performing noise cancellation. The computer initializes certain memory locations as indicated in block 201 of FIG. 7A, particularly setting a memory area to be used for the construction of a cross-spectral density matrix to zero to avoid possible computational errors. In block 202, a threshold value is set to be used in evaluating eigenvalues for inclusion or exclusion in the computation of filter constants. The computer 180 reads a data record from the data store 170 and stores the record in its memory 182 for computational purposes, as indicated in block 203. In block 205, a Fast Fourier Transform is performed on the record obtained in block 203. Optionally, a window function may be applied to the record prior to performing the transform. In block 207, the cross-spectral density contribution from that record is computed in the frequency domain and added to the existing total. Based on the frequency domain values and as represented in block 209, a cross-spectral density matrix is constructed defining cross-spectral density values for each reference sensor output with respect to itself and all other reference sensor outputs at some particular frequency. The terms of the matrix are denoted by XX+, where the + refers to the Hermitian or transpose-conjugate operator. The structure of this matrix is similar to the matrix of FIG. 4. A similar matrix is constructed of cross-spectral density values of one of the hydrophones Y with respect to each of the reference sensors $X_1$ through $X_n$ similar in structure to the matrix of FIG. 5.

In block 211 of FIG. 7B, a quantity identified as KFREQ is set equal to one, for later use in the computation. In block 213, the XX+ matrix is diagonalized using the singular value decomposition or Gram-Schmidt matrix reduction technique. In block 215, the eigenvalues of the diagonalized matrix are compared against the threshold value (e.g., one percent of the largest eigenvalue). In block 217, all those eigenvalues falling below the threshold are set to zero, and in block 219 values greater than or equal to the threshold are inverted. In this manner, the pseudo-inverse of the diagonalized matrix is computed while excluding contributions from small eigenvalues. The small eigenvalues represent either small contributions of signal or noise or represent non-independent noise sources. Accordingly in this manner, small contributions originating from the signal to be detected are excluded, thereby avoiding full or partial cancellation of the signal, and only significant independent noise sources are included in the generation of the noise-cancelled signal. In block 221, filter constants for the Wiener filter are computed in a known fashion, and in block 223, the filter constants are used in conjunction with the outputs of a selected one of the hydrophones to calculate a noise-cancelled signal Z at a particular frequency. In decision block 225, a determination is made as to whether other frequencies are included in the record obtained in block 203, by comparing the value of KFREQ to NFREQ, which represents the total number of frequency samples in the record. If additional frequency samples are to be considered, the value of KFREQ is incremented in block 229 and a return is made to block 213 to execute the sequence of actions of block 213, 215, 217, 219, and 221 to calculate another signal component Z, for the additional frequency sample, in block 223. In this illustrative embodiment, the cross-spectral density matrix constructed in block 209 covers a plurality of frequencies and in block 213, only those matrix components relating to the particular frequency in question is diagonalized.

Figure 8:
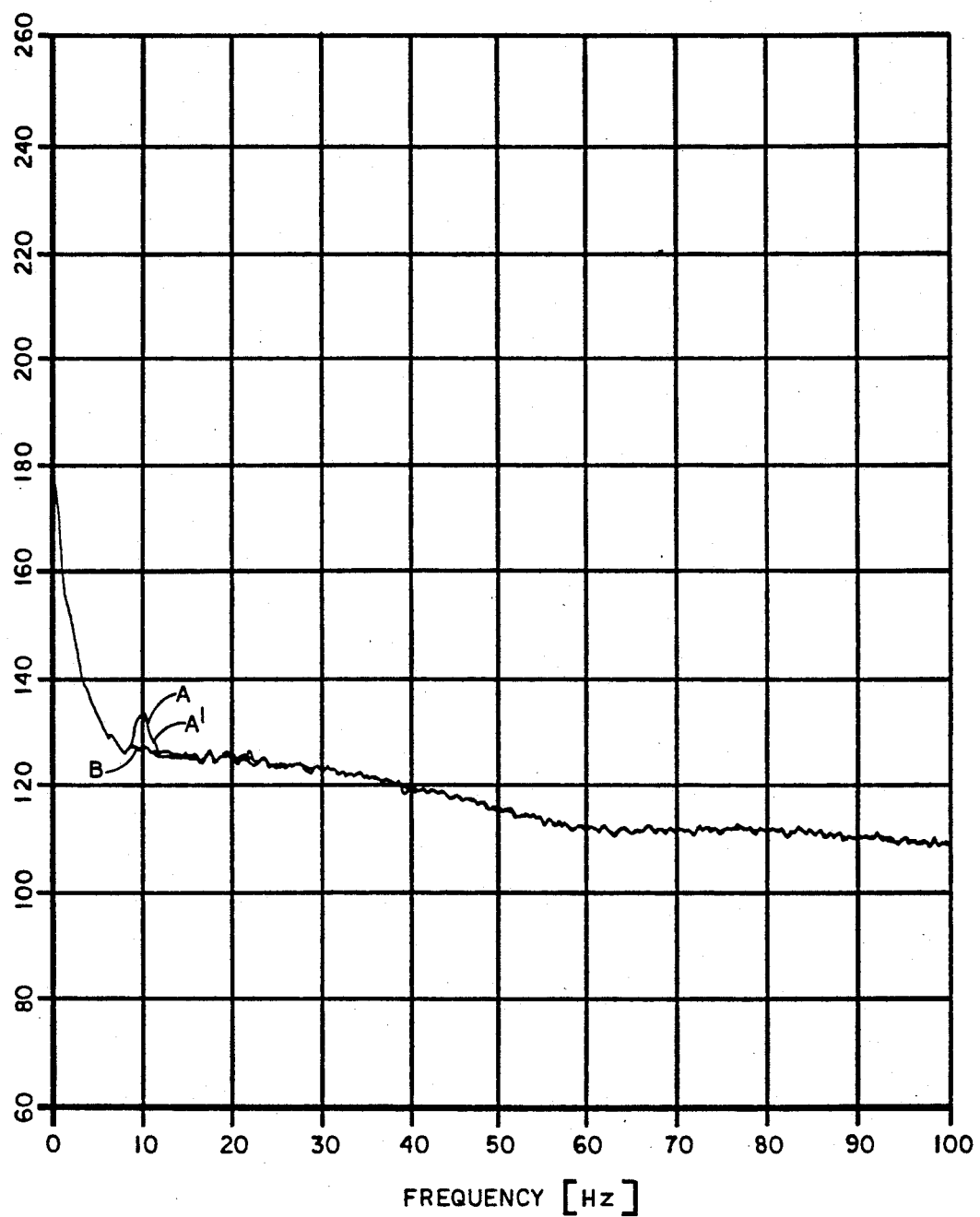
FIGS. 8 and 9 are graphs showing curves representing power spectral density of a noise source using different computational thresholds.
Figure 9:
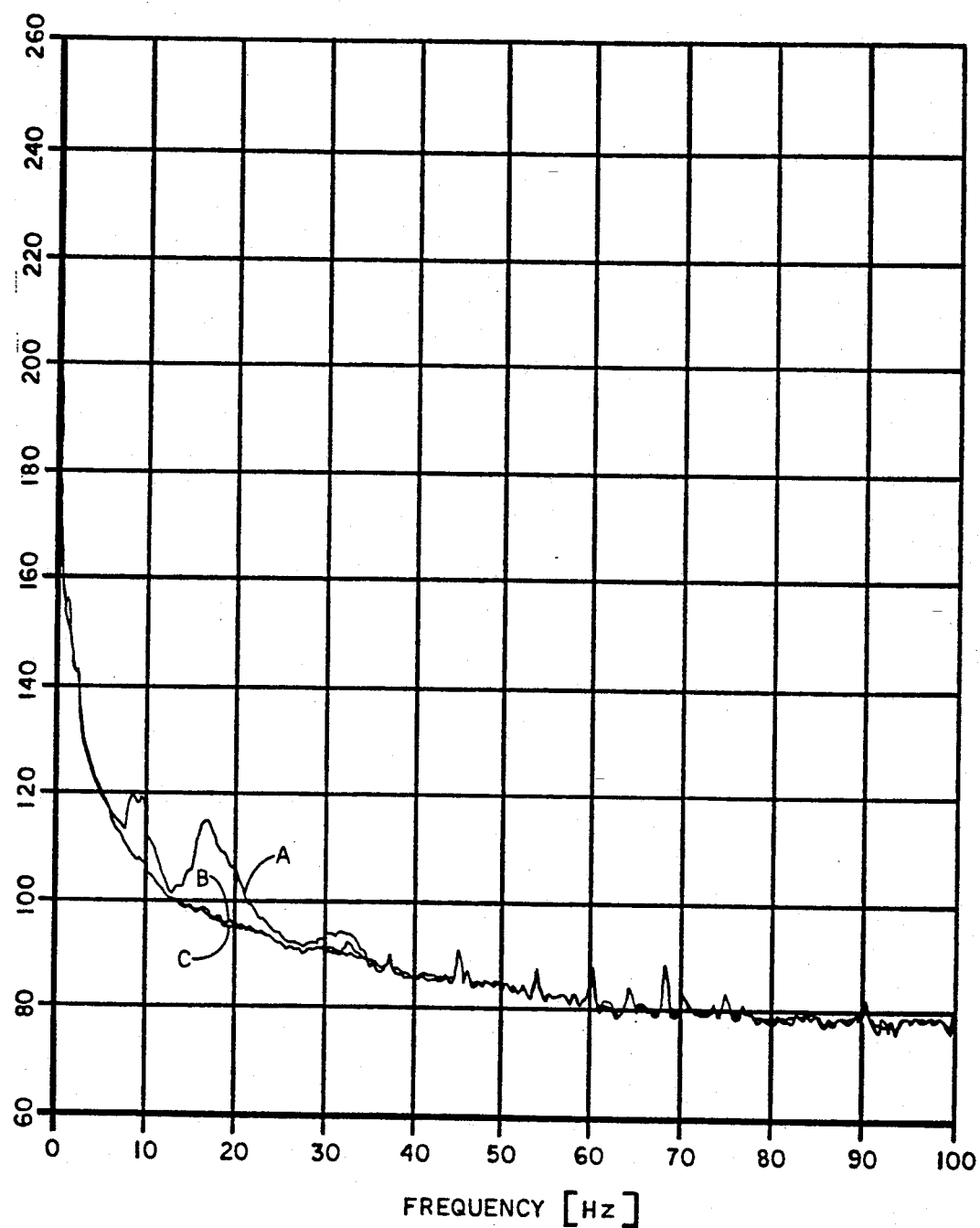

In one particular experiment, filter constants were computed from the same data using different threshold values, as described with respect to FIGS. 7A and 7B, in the generation of a power spectral density graph. FIGS. 8 and 9 show such graphs depicting the power spectral density as a function of frequency. FIG. 8 represents cross-spectral density curves using a 20 dB threshold, where the threshold value is one percent of the largest eigenvalue in the computation, and using a 40 dB threshold wherein the threshold is set at 0.01 percent of the largest eigenvalue. Curve A represents the uncorrected signal. A second curve A', substantially coincident with curve A, represents the noise-cancelled signal using a 20 dB threshold. Curve B represents the noise-cancelled signal using a 40 dB threshold. Curve B shows departure from the other curves in the 10-hertz region. The uncorrected curve A indicates the presence of a noise contribution at 10 hertz. The same contribution occurs in the curve representing the noise-cancelled signal using the 20 dB threshold. That contribution, however, has been eliminated using the 40 dB threshold as shown by curve B. An examination of the original data shows the presence of a noise source at approximately 30 dB at 10 hertz. By setting the threshold at −40 dB, this noise source was eliminated, while it was not eliminated when the threshold was set at the −20 dB level. It is therefore readily apparent that more noise signals will be detected by setting the threshold lower. However, the computer used to execute the Wiener algorithm may not have an accuracy compatible with data representing one part in ten thousand of the largest eigenvalue, or −40 dB. Furthermore, real data may be accurate to only one percent so that a 20 dB threshold may be more reasonable than the 40 dB threshold. Moreover, it is always important to quantify the extent to which the so-called "signal-free" references may pick up a portion of the signal to be detected. If it can be assumed that such a signal will be less than one percent of the noise source output sensed by the reference sensor, then a 20 dB threshold would protect the signal from being cancelled.

FIG. 9 represents cross-spectral density curves using a 20 dB threshold and a 40 dB threshold using computational data representing the output of a different experimental run than used in the computation of FIG. 8. Curve A of FIG. 9 shows the uncorrected signal while curves B and C represent noise-cancelled signals using a 20 dB and a 40 dB threshold, respectively. The results of the cancellation using the two thresholds is substantially identical except in the area around 33 hertz where a somewhat greater noise cancellation is indicated using the 40 dB threshold. It is apparent from FIG. 9, that the uncorrected signal represented by curve A has been substantially modified in the noise-cancellation process, using either the 20 or the 40 dB threshold for filter computation purposes. For example, in the region from about 8 hertz to slightly over 30 hertz, substantial noise cancellation has taken place as indicated by the significant difference between the uncorrected signal curve A and corrected signal curves B and C which are nearly coincident over the greater part of the indicated region.

Figure 7C:
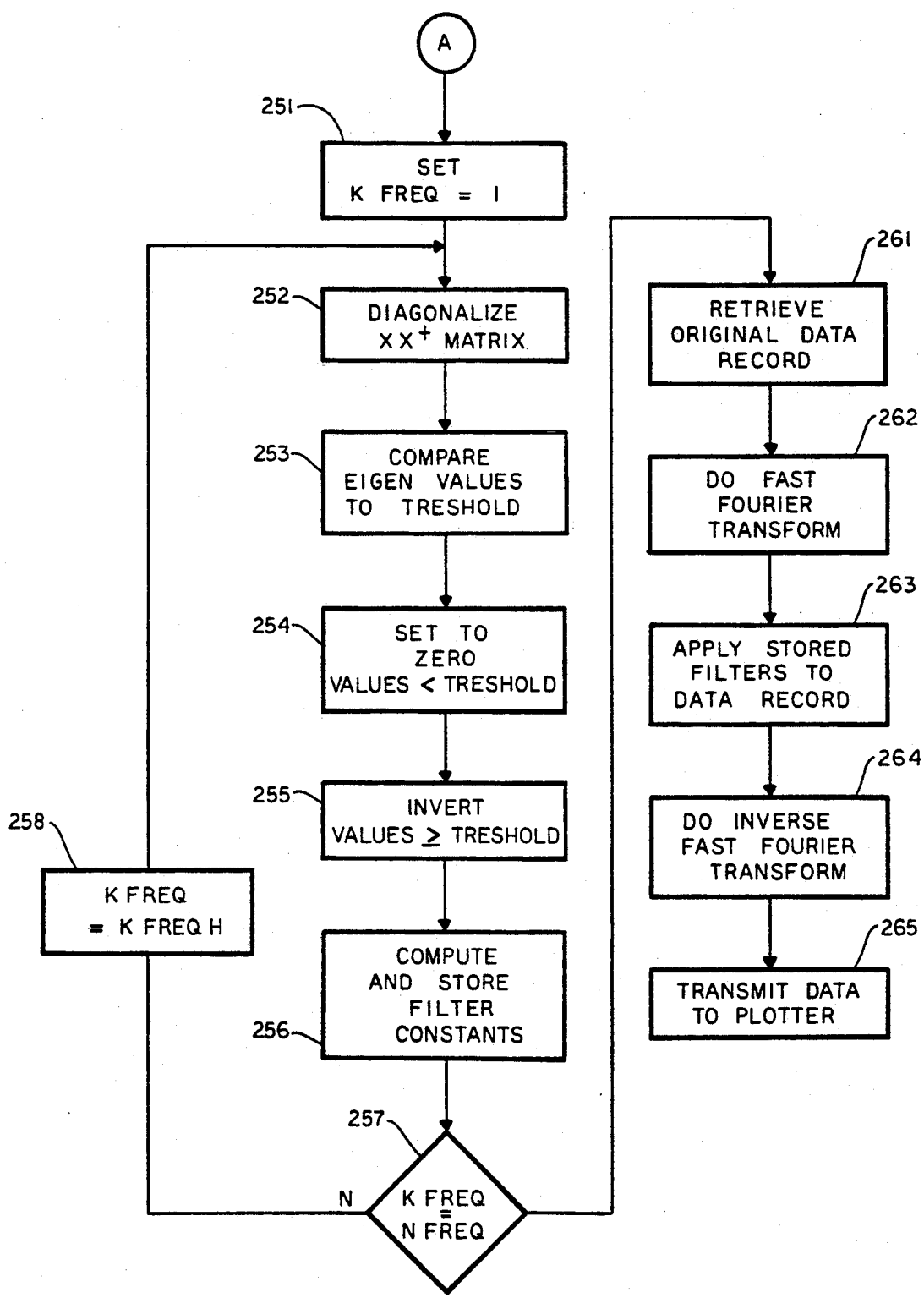

FIG. 7C represents an alternative implementation for performing noise cancellation involving the execution of steps in the time domain and the frequency domain. The method includes the steps described with respect to blocks 201 through 209 of FIG. 7A, which include the steps of reading a data record as indicated in block 203 and making a transformation into the frequency domain as indicated in block 205. In blocks 207 and 209, the cross-spectral densities are computed, and a matrix is constructed. Thereafter, a transfer is made to block 251 of FIG. 7C. In blocks 251 through 255 of FIG. 7C, functions are performed which are substantially identical to the functions described with respect to blocks 211, 213, 215, 217 and 219, respectively, of FIG. 7B. Instead of computing the filter constants and calculating the value Z as shown in blocks 221 and 223 of FIG. 7B, the filter constants are computed and stored in the memory of the computer, as indicated in block 256. Thereafter, a test is made in block 257 to determine whether additional frequencies are included in the record obtained in block 203. If so, the frequency count is incremented and the functions of blocks 252 through 258 are repeated until filter constants have been computed and stored for all frequencies in terms of frequency domain values. Thereafter, the data record corresponding to the data record obtained from memory in block 203 is again retrieved from memory, as indicated in block 261. The data record represents values in the time domain and, as indicated in block 262, a Fast Fourier Transform is performed on the record to transform those values into the frequency domain. Subsequently, as indicated in block 263, the frequency domain values for filter constants stored by the action defined in block 256 are applied to the frequency domain values of the data record. The resulting frequency domain values are transformed back into the time domain by means of an inverse Fast Fourier Transform as indicated in block 264. The time domain results may then be transmitted to a data plotter to obtain a filtered output plot in the time domain, as represented in block 265. The filter constants may be computed in the frequency domain over segments of the data record which are chosen on an overlapping basis, in a known fashion, and may then be applied to segments of the same data record in the frequency domain. The latter-named segments need not be the same as the segments chosen for the purposes of generating the filter constants. The procedure outlined in FIG. 7C has been described herein with reference to the system for performing noise cancellation on an underwater signal shown in block diagram form in FIG. 6. The procedure is equally applicable to a system for generating an electrocardiogram as depicted in block diagram form in FIG. 1 and other systems for generating noise-cancelled signals.

It will be understood that the embodiments described herein are only illustrative of the invention and numerous other arrangements and implementations of the invention may be derived by those skilled in the art without departing from the spirit and scope of the invention.

I claim:

1. A method of generating an electrocardiogram representative of a fetal heartbeat, comprising the steps of:
    placing at least one primary sensor on the abdominal area of a pregnant female in proximity of the fetus to detect signals generated by the fetal heart;
    placing a plurality of reference sensors in other regions of the female body to detect signals generated by sources other than the fetal heart;
    detecting a primary sensor output signal from said at least one primary sensor and reference sensor output signals from each of said plurality of reference sensors;
    comparing said reference sensor output signals and identifying mutually independent noise source components of said reference sensor output signals;
    generating filter constants using said identified components;
    modifying each of said reference sensor output signals by said filter constants to generate modified reference output signals;
    generating a modified primary output signal by subtracting components corresponding to said modified reference output signals from said primary output signal; and
    producing an electrocardiogram representing said modified primary output signal.

2. The method in accordance with claim 1 wherein the step of comparing comprises generating correlation data representative of differences between said reference output signals.

3. The method in accordance with claim 2 and further comprising the steps of constructing a matrix of correlation values derived from said plurality of reference output signals, converting said matrix to a diagonal matrix having elements having various values, and eliminating from said diagonal matrix elements having a values less than a predetermined threshold value.

4. The method in accordance with claim 3 wherein said threshold value is greater than primary signal contributions to said diagonal matrix elements.

5. The method in accordance with claim 3 wherein said threshold value is defined with reference to the value of at least one of said reduced matrix elements.

6. The method in accordance with claim 1 wherein said step of placing reference sensors comprising placing more reference sensors than the number of significant independent noise sources.

7. The method of generating a noise-cancelled output signal in a system comprising a primary sensor for detecting a primary signal from a primary signal source and a plurality of reference sensors for detecting noise source signals, comprising the steps of:
    detecting a primary output signal from said primary sensor;
    detecting a reference output signal from each of said reference sensors;
    comparing said primary output signal with each of said reference output signals and generating primary comparison data;
    comparing each of said reference output signals with other reference output signals and generating reference output signal comparison data;
    processing said comparison data for identifying data representing mutually independent noise source signals in said reference sensor output signals;
    generating filter constants based on information derived from said data representing mutually independent noise source signals, and said primary comparison data;
    applying said filter constants to said reference sensor output signals to generate filtered reference sensor output signals; and
    subtracting said filtered reference sensor output signals from said primary sensor output signal to generate a noise-cancelled primary signal.

8. The method in accordance with claim 7 wherein said step of comparing further comprises the steps of constructing a matrix of reference output comparison data and mathematically reducing said matrix to diagonal form to derive a reduced matrix, and wherein said step of identifying comprises the step of comparing values of components of said reduced matrix to a predetermined threshold, and wherein said step of generating filter constants comprises combining components of said reduced matrix having values greater than said predetermined threshold with said primary comparison data.

9. The method in accordance with claim 8 wherein said step of mathematically reducing said matrix of reference output comparison data comprises using a singular value decomposition algorithm.

10. The method in accordance with claim 8 wherein said matrix of reference output comparison data comprises time correlation values.

11. The method in accordance with claim 8 wherein said matrix of reference output comparison data comprises cross-spectral density values.

12. The method in accordance with claim 7 wherein said step of comparing comprises comparing a reference output at a specified time with other reference outputs at a specified different time.

13. The method in accordance with claim 7 in a system wherein said plurality of sensors comprises a number greater than the number of significant independent noise sources.

14. A method for generating a noise-cancelled primary signal in a noisy environment, comprising the steps of:
    placing at least one primary sensor in a position to primarily detect said primary signal;
    placing a plurality of reference sensors, at least equal in number to the number of known noise sources, in a position to detect primarily noise source signals;
    detecting over a predetermined period of time a primary output signal from said at least one primary sensor and an output signal from each of said reference sensors;
    defining a plurality of time delays;
    comparing said primary output signal and each of said reference output signals at a specified time with all of said reference output signals at a time delayed from said specified time by said defined delay times, and generating correlation data;
    constructing a matrix having as the matrix component data values representing correlation among said reference output signals;
    mathematically reducing said matrix to a diagonal matrix having diagonal matrix components;
    comparing said diagonal matrix components to a predetermined threshold value;
    inverting certain of said diagonal matrix components having values greater than said threshold value;
    computing filter constants using said inverted components and data defining correlation among said primary output and said reference output signals;
    generating filtered output signals by applying said filter constants to each of said reference output signals;
    subtracting said filtered output signals from said primary output signal, thereby generating data representing said noise-cancelled primary signal; and
    synthesizing said noise-cancelled primary signal.

15. A method of generating a modified output signal in a system comprising at least one primary sensor for detecting signals generated by a primary signal source and a plurality of reference sensors for detecting signals from sources other than said primary source, comprising the steps of:
    detecting a primary sensor output signal from said at least one primary sensor and reference sensor output signals from each of said plurality of reference sensors;
    comparing said reference sensor output signals and identifying mutually independent noise source components of said reference sensor output signals;
    generating filter constants using said identified components;
    modifying each of said reference sensor output signals by said filter constants to generate modified reference output signals; and
    generating a modified output signal by subtracting components corresponding to said modified reference output signals from said primary sensor output.

16. The method in accordance with claim 15 wherein the step of comparing comprises generating correlation data representative of differences between said reference output signals.

17. The method in accordance with claim 16 and further comprising the steps of constructing a matrix of correlation values derived from said plurality of reference output signals, converting said matrix to a diagonal matrix having elements having various values, and eliminating from said diagonal matrix elements having a values less than a predetermined threshold value.

18. The method in accordance with claim 17 wherein said threshold value is greater than primary sensor output contributions to said diagonal matrix elements.

19. The method in accordance with claim 17 wherein said threshold value is defined with reference to the value of at least one of said diagonal matrix elements.

20. The method in accordance with claim 17 wherein said step of detecting a primary sensor output signal and reference sensor output signals comprises detecting a plurality of said primary sensor output signals at predetermined time intervals and a plurality of reference sensor output signals from each of said reference sensors at said predetermined time intervals, and said step of constructing a matrix comprises constructing a matrix of output signals of a reference at each of said predefined time intervals with respect to output signals of other references at each of said predetermined time intervals.

21. Apparatus for generating an output signal representative of a signal source, comprising:
    a primary sensor for detecting signals from a primary signal source and generating a primary sensor output signal;
    a plurality of reference sensors, each for detecting signals from other signal sources and for generating a reference sensor output signal;
    means responsive to receipt of the reference sensor output signals to identify mutually independent noise source components of the received reference sensor output signals;
    means for generating filtered reference signals from received reference sensor output signals using identified mutually independent noise source components; and
    means responsive to a received primary sensor output signal for generating a system output signal by subtracting from the primary sensor output signal components corresponding to the filtered reference signals.

22. The apparatus in accordance with claim 21 and further comprising means responsive to receipt of the reference sensor output signals to construct a matrix of reference signal correlation values and to generate the filtered reference signals using only matrix values greater than a predetermined threshold value.

23. The apparatus in accordance with claim 22 and further comprising a graphical display unit responsive to the system output signal for graphically displaying a representation of the system output signal.

24. The method of generating a noise-cancelled output signal in a system comprising a primary sensor for detecting a signal from a primary signal source and a plurality of reference sensors for detecting noise source signals, comprising the steps of:

detecting primary output signals from the primary sensor;

detecting reference output signals from each of the reference sensors;

storing a data record of signal values representative of values of the detected primary output signals and reference output signals;

performing a transformation into the frequency domain of the stored signal values;

comparing frequency domain values representative of output signals of each of said reference sensors with frequency domain values representative of output signals of the primary sensor and other reference sensors and generating reference output comparison values;

processing said reference output comparison values for identifying values representing mutually independent noise source signals in the reference sensor output signals;

generating filter constants based on information derived from the values representing mutually independent noise source signals and storing the filter constants;

retrieving the stored data record and performing a transformation into the frequency domain of signal values representative of the primary sensor output signals and the reference sensor output signals;

applying the stored filter constant values to the data record values to generate values representative of filtered reference sensor output signals;

generating difference values by subtracting the values representative of filtered reference sensor output signals from values representative of primary sensor output signals; and performing an inverse transformation from the frequency domain into the time domain of the difference values to generate a time-domain representation of a noise-cancelled primary signal.

25. The method in accordance with claim 24 and further comprising the steps of comparing frequency domain values, processing reference output comparison values, and generating filter constants, repetitively, for each of a plurality of frequency values prior to the step of retrieving the stored data record.

26. An arrangement for generating an output signal representative of a primary signal source in the presence of other signal sources, comprising:

a primary sensor for detecting signals from the primary signal source and generating an analog primary sensor output signal comprising a plurality of signal components;

a plurality of reference sensors for detecting signals from the other signal sources and generating a corresponding plurality of analog reference sensor output signals comprising signal components attributable to mutually independent signal sources;

analog to digital converter circuitry connected to the primary and reference sensors for converting the analog primary sensor output signal and the reference sensor output signals to a digital primary output signal and a plurality of digital reference output signals;

signal generating apparatus connected to the converter circuitry and responsive to the plurality of reference output signals to generate a corresponding plurality of modified reference output signals, the modified reference output signals comprising only signal components corresponding to signal components other than signal components attributable to mutually independent signal sources; and signal generating apparatus responsive to the primary output signal to modify the primary output signal and to generate a modified primary output signal having only signal components other than signal components corresponding to components of the modified reference output signals.

* * * * *